(12) United States Patent
Zils (10) Patent No.: US 9,279,675 B2
(45) Date of Patent: Mar. 8, 2016

(54) DEVICE FOR DETERMINING AN EXTENSION LENGTH OF AN EXTENDABLE MACHINE PART

(71) Applicant: MOBA Mobile Automation AG, Limburg (DE)

(72) Inventor: Boris Zils, Limburg (DE)

(73) Assignee: MOBA MOBILE AUTOMATION AG, Limburg (DE)

( * ) Notice: Subject to any disclaimer, the term of this patent is extended or adjusted under 35 U.S.C. 154(b) by 369 days.

(21) Appl. No.: 13/907,145

(22) Filed: May 31, 2013

(65) Prior Publication Data

US 2013/0319119 A1 Dec. 5, 2013

(30) Foreign Application Priority Data

Jun. 2, 2012 (DE) ..................... 20 2012 005 462 U
Jan. 24, 2013 (EP) ..................................... 13152571

(51) Int. Cl.
*G01B 17/00* (2006.01)
*B66C 23/78* (2006.01)
*G01S 11/14* (2006.01)
*G01S 15/08* (2006.01)
*G01S 15/88* (2006.01)
*B66C 23/90* (2006.01)
*G01S 7/52* (2006.01)

(52) U.S. Cl.
CPC ................ *G01B 17/00* (2013.01); *B66C 23/78* (2013.01); *B66C 23/905* (2013.01); *G01S 7/52006* (2013.01); *G01S 11/14* (2013.01); *G01S 15/08* (2013.01); *G01S 15/88* (2013.01)

(58) Field of Classification Search
CPC ....... B66C 23/905; B66C 23/78; G01S 15/88; G01S 7/52006; G01S 11/14; G01S 15/08; G01B 17/00
USPC ............................................. 73/627, 584, 632
See application file for complete search history.

(56) References Cited

U.S. PATENT DOCUMENTS

| 5,877,693 | A  | * | 3/1999 | Eyler ............................ 340/685 |
| 8,181,798 | B2 | * | 5/2012 | Moller .......................... 212/276 |
| 2005/0258122 | A1 | * | 11/2005 | Morath ......................... 212/294 |
| 2006/0259270 | A1 | * | 11/2006 | Shimomura ................... 702/173 |

FOREIGN PATENT DOCUMENTS

| DE | 10 2008 048 307 A1 | | 1/2010 |
| DE | 10 2009 003 734 A1 | | 10/2010 |
| JP | 60-17378 A | | 1/1985 |
| JP | 2003238077 | * | 8/2003 |
| WO | WO2010003636 | * | 1/2010 |

* cited by examiner

*Primary Examiner* — J M Saint Surin
(74) *Attorney, Agent, or Firm* — Keating & Bennett, LLP (57) ABSTRACT

A device for determining an extension length of an extendable machine part includes a first ultrasound sensor and a controller, the controller determining the extension length on the basis of an ultrasound signal received by the first ultrasound sensor. The first ultrasound sensor includes a first ultrasound converter and a second ultrasound converter which are arranged such that they are offset along the measuring direction.

19 Claims, 7 Drawing Sheets

DEVICE FOR DETERMINING AN EXTENSION LENGTH OF AN EXTENDABLE MACHINE PART

CROSS-REFERENCE TO RELATED APPLICATIONS

This application claims priority from European Patent Application No. 13152571.9, which was filed on Jan. 24, 2013, and is incorporated herein in its entirety by reference.

The present invention relates to a device for determining an extension length of an extendable machine part. Embodiments relate, in particular, to an ultrasound system for length measurement, advantageously to a redundant ultrasound system for measuring the length of the extendable machine part.

BACKGROUND OF THE INVENTION

Figure 1:
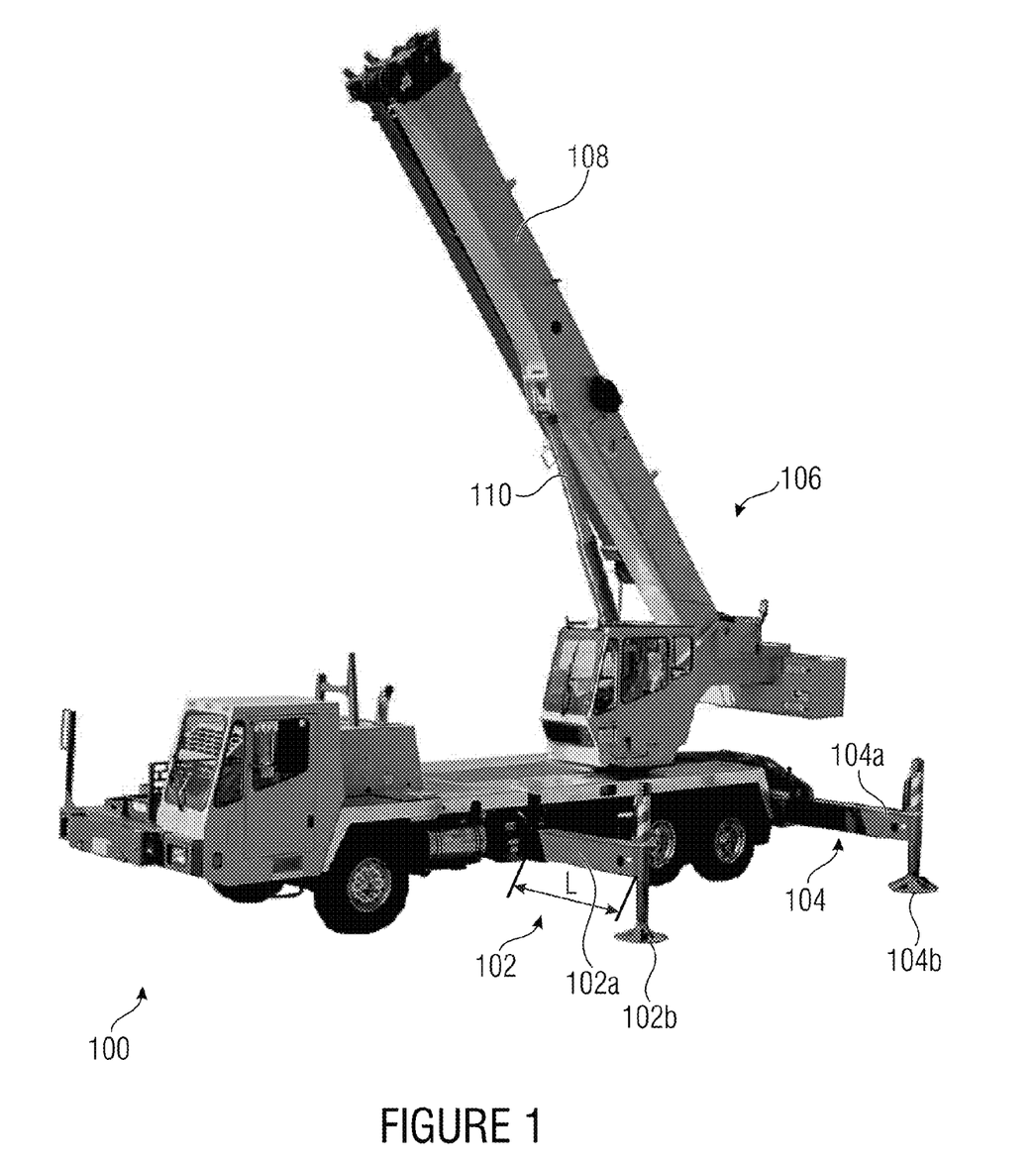
FIG. 1 shows a mobile crane as an example of a known machine comprising an extendable machine part.

Mobile machines such as elevating platforms, truck cranes, concrete pumps, for example, have extendable parts provided thereon, for example telescope cylinders or extendable supports. FIG. 1 shows an example of such a known mobile machine in the form of a mobile crane 100. In the example shown, the mobile crane 100 includes four supports, only two of which can be seen in FIG. 1 and are designated by reference numerals 102 and 104 in the FIG. Each of said supports 102, 104 includes a horizontal punch 102a, 104a, each of which has a vertical punch 102b, 104b arranged thereon. The horizontal punches 102a and 104a are movable in the horizontal direction and may be extended, as is shown in FIG. 1, FIG. 1 indicating an extension length L. The vertical punches 102b and 104b are arranged to be vertically movable. The mobile crane 100 further includes a pivoted crane top piece 106 comprising a crane arm 108. The crane arm 108 may include several segments not shown in FIG. 1 which may be extended with regard to the representation shown in FIG. 1 so as to adjust a height and range of the crane in accordance with the requirements. The crane arm 108 or the segments of the crane arm 108 may be actuated by corresponding hydraulic telescope cylinders, for example.

In mobile machines, the horizontal arms 102a, 104a are extended for support purposes, and the vertical punches 102b, 104b arranged on their outer ends are moved downward to enable the vehicle or the mobile machine to be supported on the ground, so that the vehicle takes on a stable position and no longer rests on the wheels, for example. Depending on the circumstances, the crane arm 108 may be extended to corresponding heights during operation, as was mentioned above, and a tilt of the crane arm 108 is adjusted, for example, by retracting/extending a cylinder 110.

Both actuation of the supports 102, 104 and actuation of the cylinders in the crane arm 108 and/or of the cylinder 110 are to be monitored in order to insure safe operation of the crane.

The further the horizontal punches 102a, 104a are extended, the larger the extent of lateral cantilevering of the work tool, e.g. of the crane arm 108 or of the lifting platform, may be without there being a danger of tipping or of instabilities. A simple control would consist in invariably extending the supports to a maximum in order to enable as large a deflection of the work tool as possible. However, this maximum extension of the supports is not always possible or not always desired, for example due to limited spatial conditions or due to the fact that a maximum deflection of the work tool is not required at all. For this reason it is desirable to measure in as exact a manner as possible the extent to which the four extension punches 102a, 104a and/or the cylinders are extended for actuating the work tool so as to then ensure optimum stability, in connection with load measurement, while making optimum use of lateral cantilevering. To achieve a sufficiently high level of work safety, it is useful that this length measurement be effected in as exact a manner as possible.

Conventional technology has predominantly used cable haulage sensors for measuring the extension length. Said cable haulage sensors typically comprise a steel cable coupled to a spring-biased winding device and a single-path or multi-path potentiometer attached thereon. Relatively recent cable-actuated encoders use contactless sensor elements, e.g. Hall sensors, instead of the potentiometers. A disadvantage of said known-actuated encoders consists in the fact that they comprise a multitude of movable parts, which in their turn are relatively susceptible to failure. In addition, their applicability in rough mobile operation is limited. Moreover, the mechanical parts exhibit increased wear so that in most cases two of said sensors are installed in order to insure sufficient safety.

A further approach known in the art to detecting the lengths of the extendable machine parts consists in providing optical distance sensors. The disadvantage of said optical distance sensors, however, consists in that light is used for measuring the distance, so that they are susceptible to contamination.

Yet other approaches describe utilization of ultrasound sensors, which are often used also in construction machines. Here, an ultrasound converter is provided which sends out sound waves having specific acceptance angles, a timer being started with said sending-out. The ultrasound waves sent out are then reflected by an object upon which they impinge and are returned to the converter, which will then act as a receiver. There the signal received is amplified, and the timer is stopped, so that the distance of the object from the converter may be inferred from the amount of time that has passed between sending and receiving the ultrasound signal. What is disadvantageous about this configuration is that the sound propagation cannot be narrowly focused, so that measuring within very small spaces, as is the case, in particular, with applications in mobile devices, is possible only with a large amount of effort.

A further approach to determining an extension length is described in DE 10 2008 048 307 A1, according to which two ultrasound sensors are provided; a first time delay between sending and receiving a first ultrasound signal sent by the first converter and a second time delay between sending and receiving a second ultrasound signal sent by the second converter are used for determining a distance. What is disadvantageous is that the system includes merely one stationary sensor and one movable sensor.

On the basis of this conventional technology, it is the object of the present invention to provide an improved approach to determining an extension length of an extendable machine part, said approach being both robust and providing a satisfactory solution to the measurement task with regard to safety, so that a system including such a device exhibits increased safety of operation and works at a higher level of precision.

SUMMARY

According to an embodiment, a device for determining an extension length of an extendable machine part may have: a first ultrasound sensor; and a controller configured to determine the extension length on the basis of an ultrasound signal received by the first ultrasound sensor, wherein the first ultrasound sensor has a first ultrasound converter and a second ultrasound converter which are arranged such that they are offset along the measuring direction.

According to another embodiment, a mobile machine may have: an extendable machine part, and a device for determining an extension length of an extendable machine part, which device may have: a first ultrasound sensor; and a controller configured to determine the extension length on the basis of an ultrasound signal received by the first ultrasound sensor, wherein the first ultrasound sensor includes a first ultrasound converter and a second ultrasound converter which are arranged such that they are offset along the measuring direction Embodiments of the invention provide a device wherein the first ultrasound sensor includes a carrier which has the first ultrasound converter and the second ultrasound converter arranged thereon. The carrier may comprise two surfaces aligned in the measuring direction and having the first ultrasound converter and the second ultrasound converter arranged thereon. The carrier may be L-shaped in cross-section.

Embodiments of the invention provide a device wherein the controller is configured to determine the extension length on the basis of the ultrasound signals received by the first ultrasound converter and the second ultrasound converter.

Embodiments of the invention provide a device wherein the first ultrasound converter and the second ultrasound converter are arranged such that they are offset by a predetermined distance, and wherein the controller is configured to derive an ambient temperature on the basis of the distance between the first ultrasound converter and the second ultrasound converter and of a difference in the time delays of the ultrasound signals received by the first ultrasound converter and the second ultrasound converter.

Embodiments of the invention provide a device wherein the controller is configured to control the first ultrasound sensor to optionally send and receive ultrasound signals.

Embodiments of the invention provide a device wherein the controller is configured to initially control the first ultrasound sensor to send out an ultrasound signal, and to control the first ultrasound sensor, after the ultrasound signal has been sent out, to receive a reflected ultrasound signal by the first ultrasound converter and by the second ultrasound converter.

Embodiments of the invention provide a device wherein the first ultrasound sensor is arranged in a stationary manner or is arranged to move in response to a movement of the extendable machine part.

Embodiments of the invention provide a device comprising a second ultrasound sensor, the controller being configured to control the second ultrasound sensor to send out an ultrasound signal in the direction of the first ultrasound sensor, and to control the first ultrasound sensor to receive the ultrasound signal, sent out by the second ultrasound sensor, by the first ultrasound converter and the second ultrasound converter of the first ultrasound sensor.

Another embodiment may have a mobile machine wherein the extendable machine part includes one or more supports, one or more punches, a work tool, a lifting platform, and/or a telescope cylinder.

In accordance with embodiments, one of the ultrasound sensors is arranged in a stationary manner, and the other one of the ultrasound sensors is arranged to move in response to a movement of the extendable machine part.

In accordance with embodiments, the ultrasound sensors are arranged such that their distance increases or decreases the further the extendable machine part is extended.

In accordance with embodiments, the second ultrasound sensor includes a first ultrasound converter and a second ultrasound converter which are arranged such that they are offset along the measuring direction, and the controller is configured to control one of the ultrasound converters of the second ultrasound sensor to send out the ultrasound signal.

In accordance with embodiments, the offset of the ultrasound converters of the first ultrasound sensor and the offset of the ultrasound converters of the second ultrasound sensor are identical, and the first ultrasound sensor and the second ultrasound sensor are arranged such that the distance between the first ultrasound converter of the first ultrasound sensor and the second ultrasound converter of the second ultrasound sensor as well as the distance between the second ultrasound converter of the first ultrasound sensor and the first ultrasound converter of the second ultrasound sensor are identical.

In accordance with embodiments, the controller is effective to control, during a first measurement, an ultrasound converter of the first ultrasound sensor to send out a first ultrasound signal, and to control the ultrasound converters of the second ultrasound sensor to receive the first ultrasound signal in each case, to control, during a second measurement, an ultrasound converter of the second ultrasound sensor to send out a second ultrasound signal, and to control the ultrasound converters of the first ultrasound sensor to receive the second ultrasound signal in each case, and to generate a plurality of distance values on the basis of the second ultrasound signals received at the ultrasound converters of the first ultrasound sensor and of the first ultrasound signals received at the ultrasound converters of the second ultrasound sensor.

In accordance with embodiments, the controller is effective to generate one or more temperature compensation signals on the basis of a difference between the second ultrasound signals received at the ultrasound converters of the first ultrasound sensor and on the basis of a difference between the first ultrasound signals received at the ultrasound converters of the second ultrasound sensor.

In accordance with embodiments, the controller is effective to perform a plausibility evaluation of the measurement on the basis of the distance values.

The present invention therefore provides a mobile machine comprising an extendable machine part and the inventive device for determining an extension length of an extendable machine part.

In accordance with embodiments, the extendable machine part includes one or more supports, one or more punches, a work tool, a lifting platform, and/or a telescope cylinder.

Thus, embodiments of the present invention provide a device which—unlike the configuration as is known from DE 10 2008 048 307 A1—comprises a stationary or movable ultrasound sensor comprising two ultrasound converters, or ultrasound transducers, which are arranged such that they are mutually offset in the measuring direction, i.e. in that direction in which ultrasound signals are sent out and/or received, for example by arranging the corresponding ultrasound transducers, or ultrasound converters, within a housing configured accordingly.

In accordance with embodiments, a pair of ultrasound sensors is provided which comprises first and second ultrasound sensors arranged opposite each other and each comprising two ultrasound converters arranged such that they are mutually offset. In response to a control signal of evaluation electronics and/or of a controller, the first ultrasound converter initially sends out an ultrasound signal, which is received by the two opposite converters of the second sensor. Along with outputting the ultrasound signal, a timer is started, which is stopped upon reception of the ultrasound signal, so that the distance may be calculated by the evaluation electronics and/or the controller on the basis of the time delay of the ultrasound signal. This embodiment further enables deriving the ambient temperature from the difference of the time delays of the ultrasound signals received at both offset converters since the distance between the two ultrasound converters of the received ultrasound sensor is fixed and constant. After a specified pause, the second ultrasound converter may now send out a signal back to the first converter. For this purpose, one of the converters of the second sensor is controlled to output an ultrasound signal, which is then detected by the two converters of the first sensor, which may then, again on the basis of the signals received, calculate the distance and thus may trigger a further temperature measurement. This yields two measurement values as well as corresponding temperature compensation measurement values, which may be taken into account when determining the extension length. On the basis of the two measurements, a plausibility check of the distance measurement values obtained may also be performed.

In order to increase safety, provision may be made, in accordance with the invention, for starting a further measurement; the same measurements as were described above were performed, but the ultrasound signals are now output by the second converters of the two ultrasound sensors and/or send/receive units, so that there are four measurements that may be checked for plausibility and/or may also be output separately.

Thus, embodiments of the invention disclose a device for measuring the length of telescope cylinders, supports or punches, the device including an ultrasound sensor comprising at least two ultrasound converters with associated electronics for sending and receiving ultrasound signals for time delay measurement, the two ultrasound converters being arranged such that they are offset in the measuring direction. In each case, one ultrasound converter may send out an ultrasound signal, which will be received by the two opposite converters. The sensors can also be operated both ways so as to alternately send and receive in order to obtain the above-described improved safety of operation and accuracy.

In accordance with other embodiments, provision may be made for providing only one ultrasound sensor which includes the two converters that are arranged in a mutually offset manner, and to send out a signal, on the part of one of the converters, which will be reflected back upon impinging upon an object; in this case, both converters of the sensor are provided for detecting the reflected signal.

BRIEF DESCRIPTION OF THE DRAWINGS

Embodiments of the present invention will be detailed subsequently referring to the appended drawings, in which.

DETAILED DESCRIPTION OF THE INVENTION

In the following description of the embodiments, identical or similar elements are provided with the same reference numerals.

Figure 2:
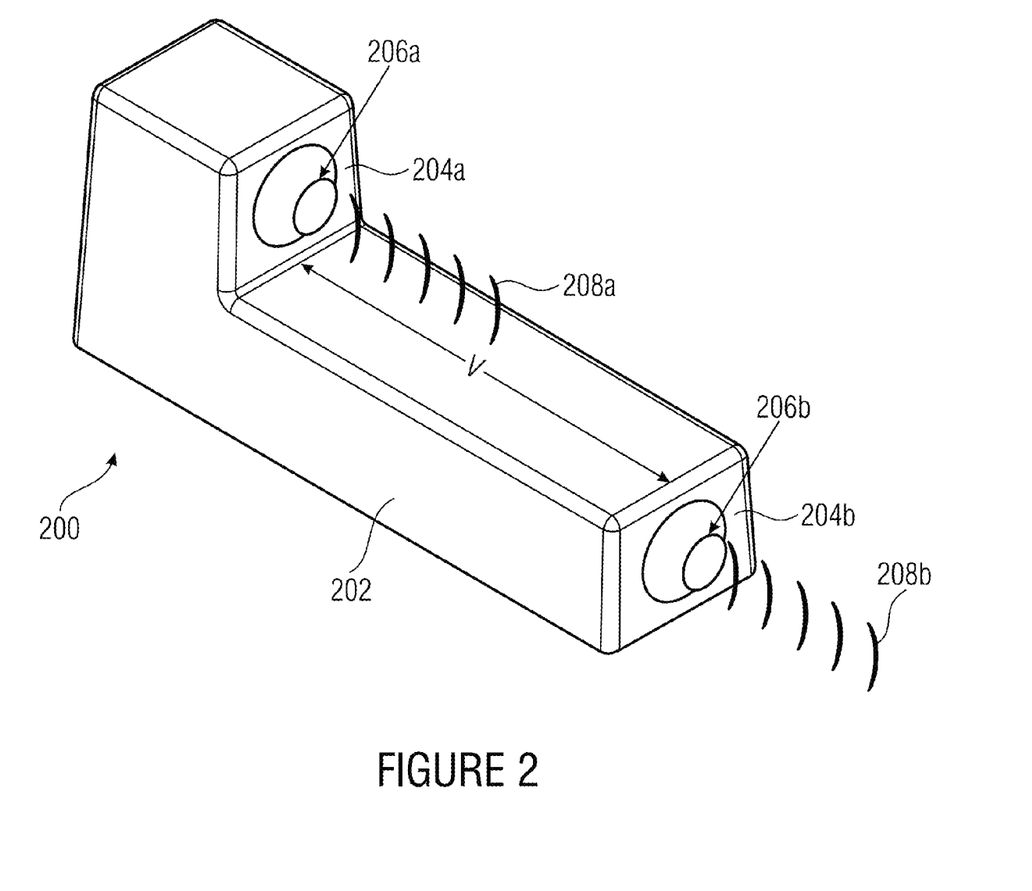
FIG. 2 shows an isometric representation of an ultrasound sensor in accordance with an embodiment of the present invention.

FIG. 2 shows an isometric representation of an ultrasound sensor in accordance with an embodiment of the present invention. The ultrasound sensor 200 includes a carrier 202 having an L-shaped cross-section in the embodiment depicted. The carrier 202 includes two surfaces 204a, 204b aligned in the measuring direction or having a first ultrasound converter 206a and a second ultrasound converter 206b arranged thereon. The ultrasound converters 206a, 206b are arranged on the surfaces 204a, 204b. Alternatively, however, the converters may also be embedded within the body of the carrier 202 such that the ultrasound energy is radiated in a manner perpendicular to the surfaces 204a, 204b, as is shown by the ultrasound signals 208a, 208b schematically shown in FIG. 2. The surfaces 204a, 204b have a distance V in the measuring direction, so that the ultrasound converters 206a, 206b are arranged with the fixed mutual offset V. Instead of the carrier 202 shown in FIG. 2, differently shaped carriers may also be provided, as long as radiation of the ultrasound energy 208a, 208b in the same direction of the corresponding sensors is possible with a mutual offset.

Figure 3:
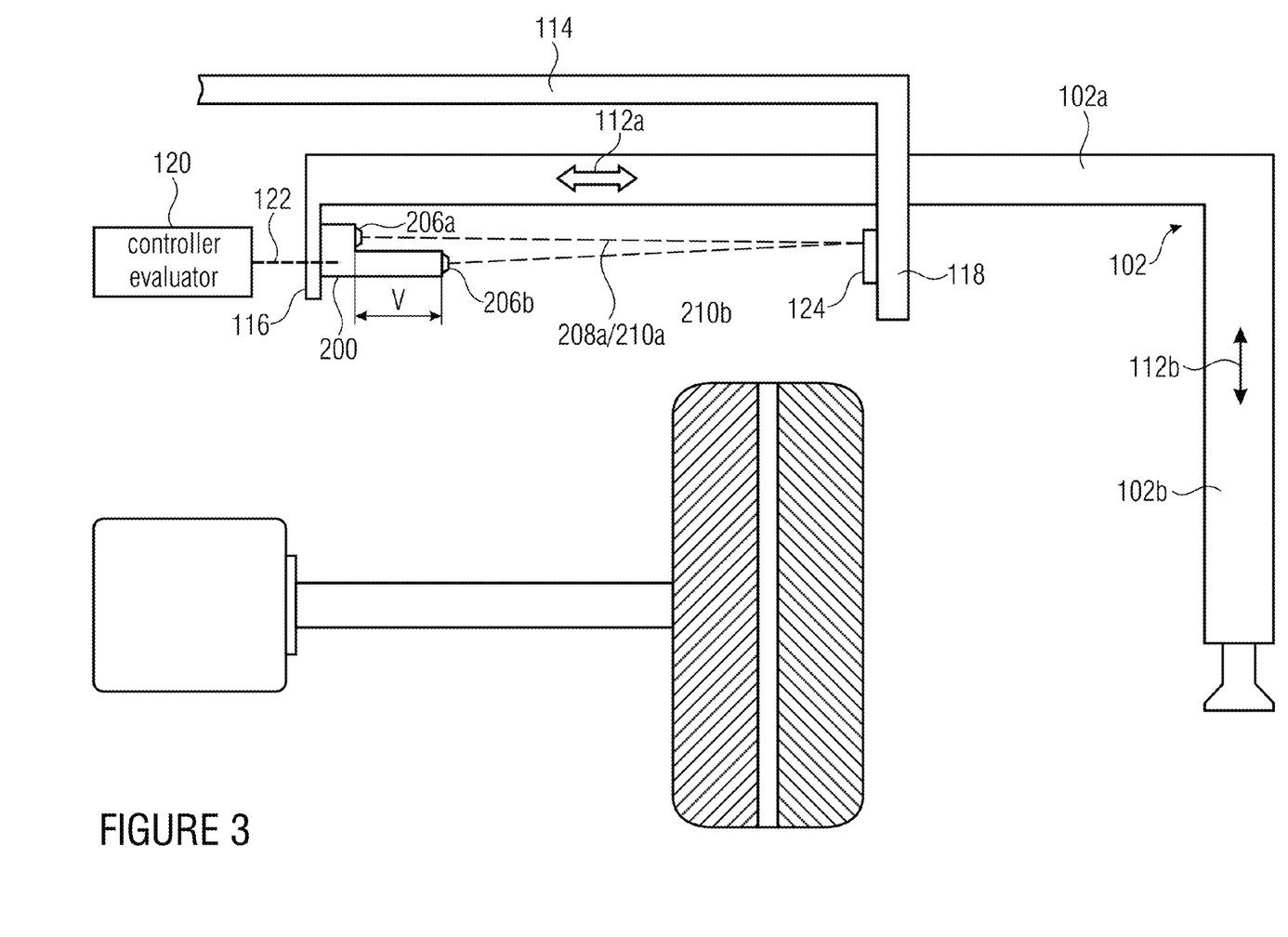
FIG. 3 shows a schematic representation of an arrangement of the sensor in accordance with FIG. 2 on a mobile crane as is shown in FIG. 1, in accordance with an embodiment of the present invention.

The functionality of the sensor shown in FIG. 2 will be explained in more detail below with reference to FIG. 3. FIG. 3 shows an example of an arrangement of the sensor 200 on a mobile crane as is shown in FIG. 1. FIG. 3 schematically represents the horizontal punch 102a as well as the vertical punch 102b. As is indicated by the arrows 112a, 112b, the horizontal punch 102a is horizontally displaceable, and the vertical punch 102b is vertically displaceable. FIG. 3 further shows part of the chassis 114 at which the support 102 is movably arranged in a known manner. The horizontal punch 102a includes a projection 116 which is arranged within the chassis 114, extends downward and has an ultrasound sensor 200 as was described by FIG. 2 attached to it. The chassis 114 includes a portion 118 which also extends downward, and the sensor 200 is arranged at the projection 116 such that ultrasound signals and/or ultrasound energy radiated by one of the sensors 206a, 206b impinge upon the portion 118 of the chassis 114 and are reflected back to the sensor 200 by it. The reflected ultrasound energy is received by the ultrasound converters 206a, 206b of the ultrasound sensor 200.

In addition, a controller/evaluator 120 is provided which is effectively connected to the sensor 200, as is schematically indicated by the dashed line 122. The controller 120 may be connected to the ultrasound sensor 200 via an electric connection, for example a CAN bus. The ultrasound energy output by the ultrasound sensor 200 may be directly reflected by the portion 118 of the chassis 114. In accordance with embodiments, however, provision may also be made for providing a reflector 124 which supports reflection of the ultrasound energy back in the direction of the ultrasound sensor 200.

In the embodiment shown in FIG. 3, the sensor 200 is arranged at the movable punch 102 and sends ultrasound energy in the direction of the chassis portion 118 and receives the sound energy reflected by same. Alternatively, provision may also be made for attaching the sensor 200 to the chassis 114 and to direct the ultrasound energy onto the portion 116 of the movable support 102 and to receive ultrasound energy reflected by said projection 116.

The functionality of the arrangement described by means of FIG. 3 will be explained in more detail below. The controller 120 operates such that in a first step, initially one of the ultrasound converters 206a, 206b of the sensor 200 is activated, for example the converter 206a, to send out a first ultrasound signal 208a, which impinges upon the reflector 124 and/or upon the portion 118 and is reflected at same. Once the ultrasound signal 208a has been sent out, the controller 120 causes the ultrasound converters 206a, 206b to be switched to the receive mode so as to receive the ultrasound energy 210a, 210b reflected by the chassis 114. Simultaneously with the ultrasound signal 208a being sent out, a timer is started, which is stopped upon reception of the ultrasound energy at the switched converters 206a and 206b. In this manner, for one thing the time delay T1 of the ultrasound signal from the converter 206a to the portion 118 and back to the converter 206a as well as the time delay T2 from the converter 206a to the portion 118 and back to the converter 206b may be determined. From the time delay measurements T1 and T2, a distance between the sensor 200 and the portion 118 may then be measured by the controller/evaluator 120, and the extension length of the support 102 may be determined therefrom. More precisely, the extension length may be determined on the basis of the time delay T1, and also on the basis of the time delay T2, it being possible to determine, because of the known distance V between the converters 206a and 206b and despite the shorter time delay T2, an extension length which corresponds to the time delay T1. The two extension lengths obtained may be verified with regard to their plausibility, i.e. one may verify the extent to which the two independent measurements result in distances which are below a certain tolerance threshold, e.g. which deviate by less than 10% from each other, and only in that case will the measurement be regarded as reliable.

Due to the offset arrangement of the converters 206a and 206b, the inventive sensor 200 additionally enables determining the ambient temperature and/or enables compensating for possible temperature fluctuations based on a difference in the time delays of the signals. If there is a constant temperature, a time delay difference between the reflected signals 210a, 210b will result due to the distance V, said difference corresponding to a corresponding threshold value, which may be calculated from the distance V, a specified temperature and a corresponding ultrasound signal. In the event of changing temperatures, the propagation properties of the ultrasound energy will also change, so that the difference between the time delays T1 and T2 will deviate from the threshold value, from which one may infer a corresponding change in temperature.

Figure 4:
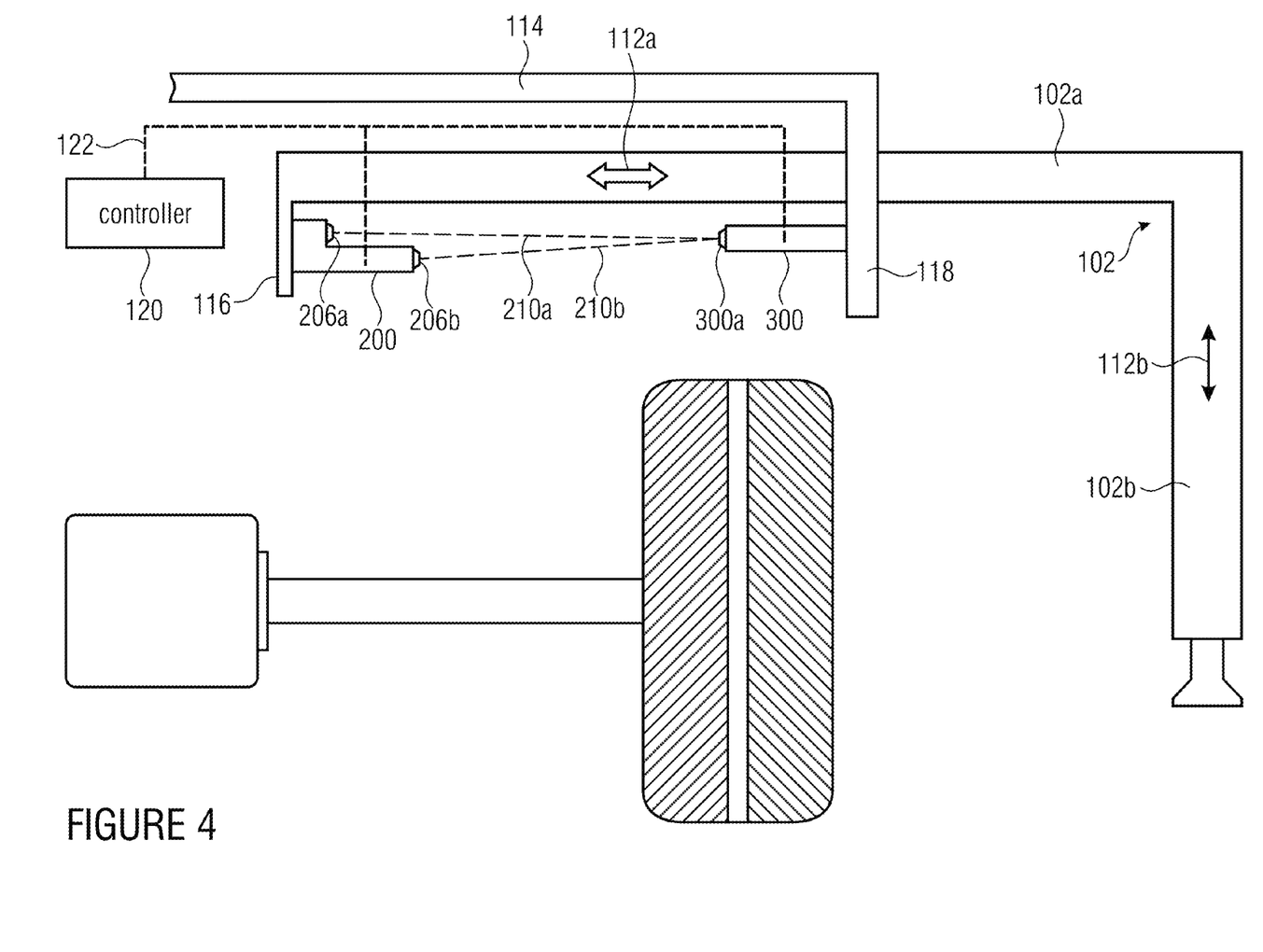
FIG. 4 shows a schematic representation of an arrangement of the sensor in accordance with FIG. 2 similarly to FIG. 3, an additional ultrasound sensor being provided.

A further embodiment comprising a further ultrasound sensor 300 will be described with reference to FIG. 4. Via the connection 122, the controller 120 is connected both to the first ultrasound sensor 200 and to the second ultrasound sensor 300 so as to effectively control them and to simultaneously obtain corresponding measurement signals from them. The further ultrasound sensor 300 includes a single converter 300a outputting an ultrasound signal which is received by the converters 206a and 206b of the sensor 200, as is schematically depicted by the signals 210a and 210b. The sensor 300 is arranged at the portion 118 of the chassis 114. The functionality of the system of FIG. 4 is essentially the same as the functionality described above with reference to FIG. 3, with the difference that the controller 120 causes the sensor 300 to radiate an ultrasound signal 210a, 210b which will be detected by the converters 206a and 206b of the sensor 200, so that the above-described time delays T1 and T2 may be determined on the basis of the signals detected, and from this, the distance between the sensors, on the one hand, and a possible change in temperature, on the other hand, may be determined.

Figure 5:
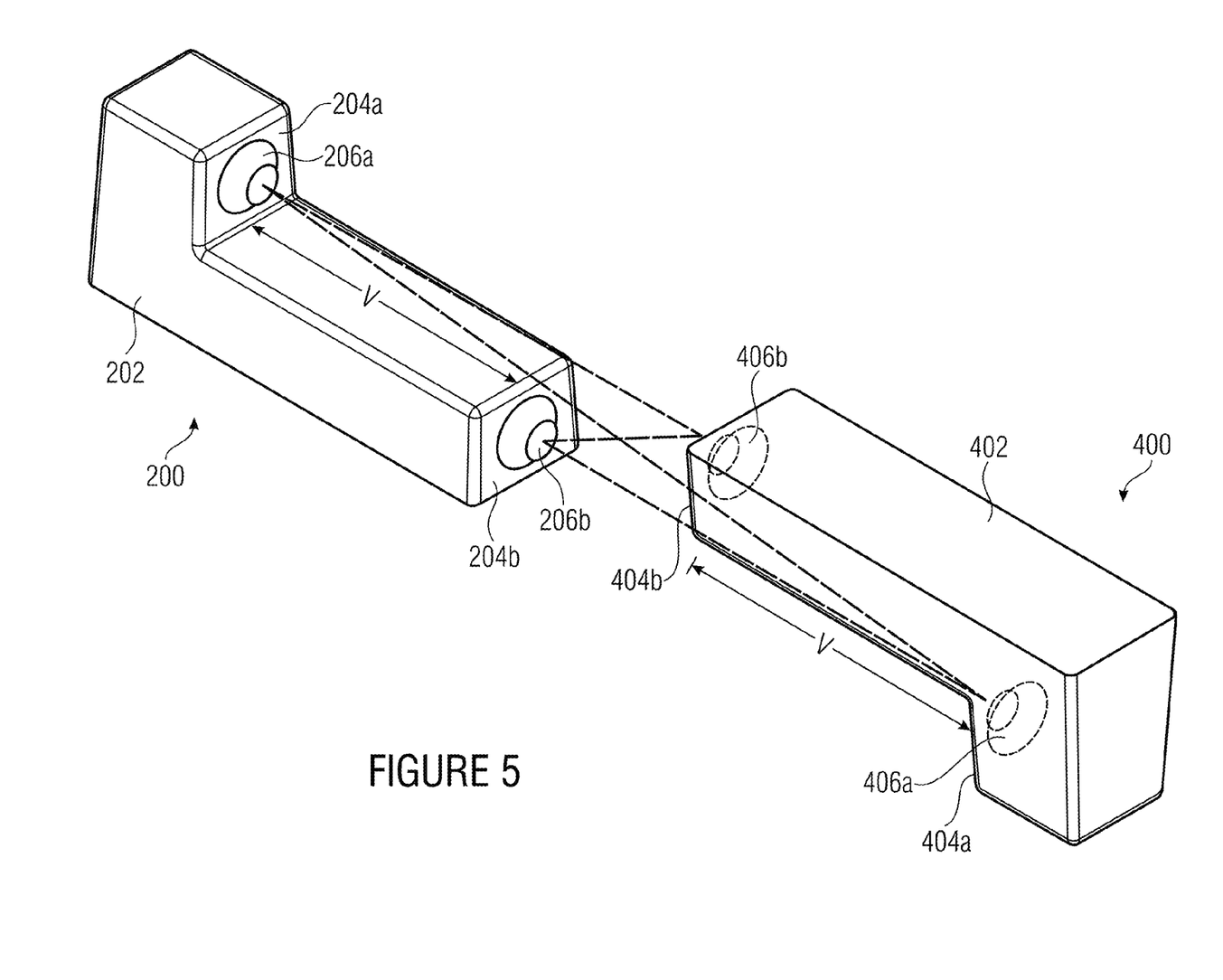
FIG. 5 shows an isometric representation of an ultrasound measurement device in accordance with a further embodiment of the present invention, said device including two sensors in accordance with FIG. 2.

FIG. 5 shows a further embodiment in accordance with the present invention, wherein a sensor arrangement uses two sensors of FIG. 2. The sensor arrangement shown in FIG. 5 includes the first sensor 200, which was already described by means of FIG. 2, as well as a structurally identical second sensor 400, which also includes a carrier 402 as well as the surfaces 404a and 404b and the ultrasound converters 406a and 406b arranged with respect to it. The two sensors 200 and 400 are mutually aligned such that the surfaces 204a, 204b and 404a and 404b are opposite each other, which thus also goes for the corresponding sensors 206a, 206b, and 406a, 406b, respectively. Just like with the first sensor 200, for the second sensor 400, too, the sensors 406a, 406b are spaced apart from each other by the same distance V. The sensors 200 and 400 are mutually aligned in the manner shown in FIG. 5, namely such that the distances between the sensors 206a and 406b and between the sensors 206b and 406a, respectively, are identical.

Figure 6:
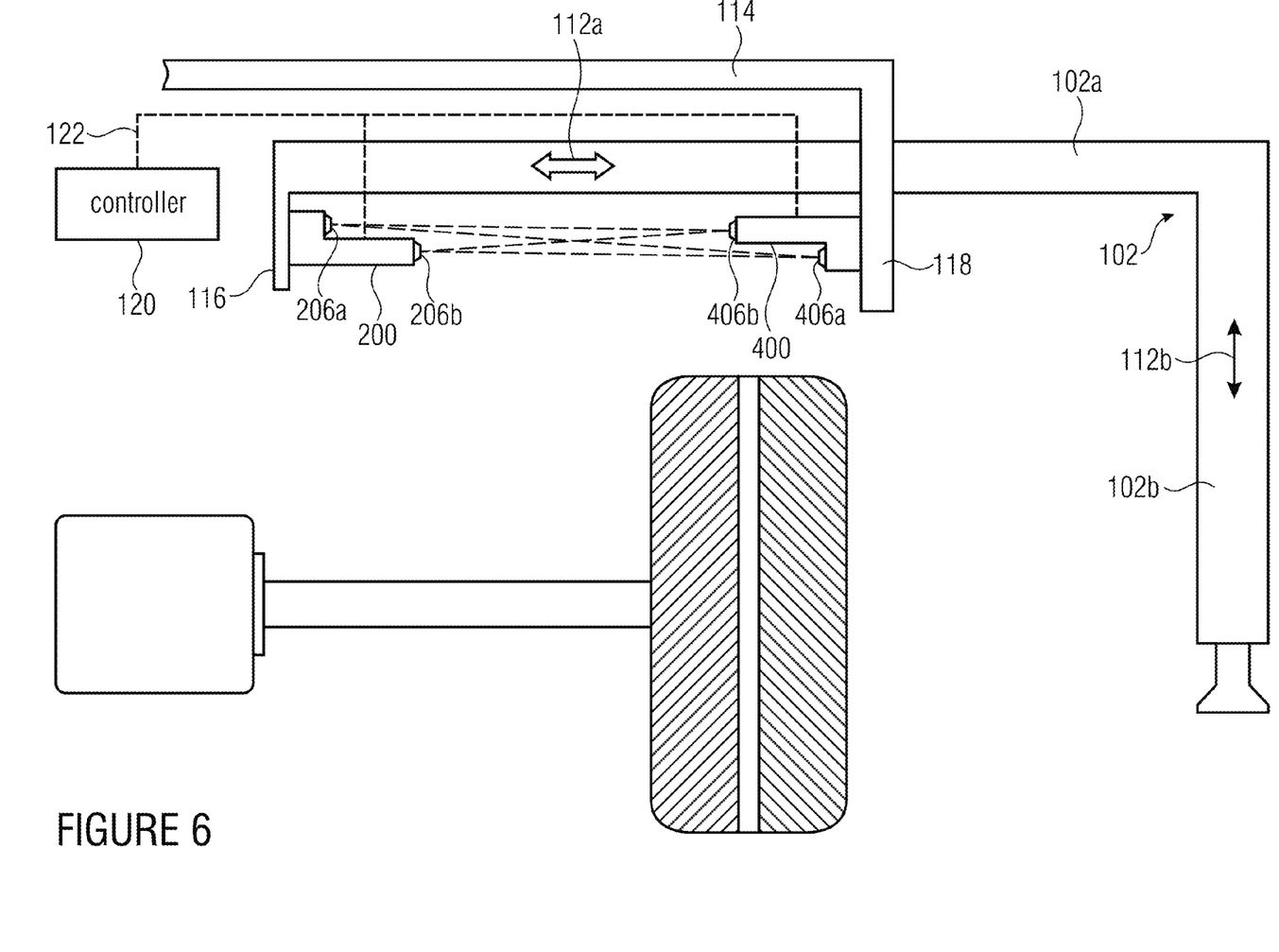
FIG. 6 shows a device similar to that in FIG. 3 and comprising the sensor arrangement in accordance with FIG. 5.

FIG. 6 shows a device similar to that of FIG. 3, wherein the sensor arrangement of FIG. 5 is used. As one may see, the first sensor 200 is attached to the projection 116 of the horizontal strut 102a, and the second sensor 400 is attached to the projection 118 of the chassis 114, in a manner such that the distances between the corresponding first and second converter elements 206a, 406b, and 206b, 406a, respectively, are identical.

The functionality of the detection device shown by means of FIG. 6 will be explained in more detail below. The controller 120 is effective to control the ultrasound sensors 200 and 400 so as to operate them either in the receive mode or in the send mode. At the beginning of a measurement, the controller 120 causes the ultrasound sensor 200 to operate in the send mode, and one of the ultrasound converters, for example the ultrasound converter 206a, is controlled to send out an ultrasound signal in the direction of the second sensor 400. Simultaneously with the ultrasound signal being sent out, the controller 120 starts the timer and further controls the second ultrasound sensor so that same will be in the receive mode. The ultrasound converters 406a, 406b of the second ultrasound sensor 400 receive the ultrasound signal sent out by the ultrasound converter 206a, and upon reception of the signals at the ultrasound sensor 400, the controller 120 stops the timer, as a result of which the above-mentioned time delays T1 and T2 are determined. The distance between the sensors 200 and 400 and, thus, the extension length of the element 102 is determined from the time delays. Moreover, a measurement value concerning the ambient temperature is derived in the above-described manner on the basis of the difference in the time delays, so as to perform temperature compensation for the measurement values if need be. Following a predetermined pause, the controller 120 effects switching of the functionalities of the ultrasound sensors 200 and 400 such that now the ultrasound sensor 200 is in the receive mode, and the ultrasound sensor 400 is in the send mode. The controller further causes one of the ultrasound converters of the second ultrasound sensor 400, for example the ultrasound converter 406b, to send out an ultrasound signal, which will be received by the ultrasound converters 206a, 206b of the first ultrasound converter 200, which now are operating in the receive mode. Upon the ultrasound signal being sent out, a timer is again started so as to detect the receive time and, thus, the time delays T1 and T2, as was described above, so as to therefrom calculate the distance and possibly trigger further temperature compensation.

In order to increase safety, provision may be made for starting at least one further measurement which corresponds to the above-described measurement, and the measurement values resulting from the four measurements may be verified for plausibility or may be output separately. In said further measurement, the sensors are controlled such that the ultrasound signals are sent out by the other ones of the converters (which were not used for sending out the ultrasound signals in the first measurement).

Figure 7:
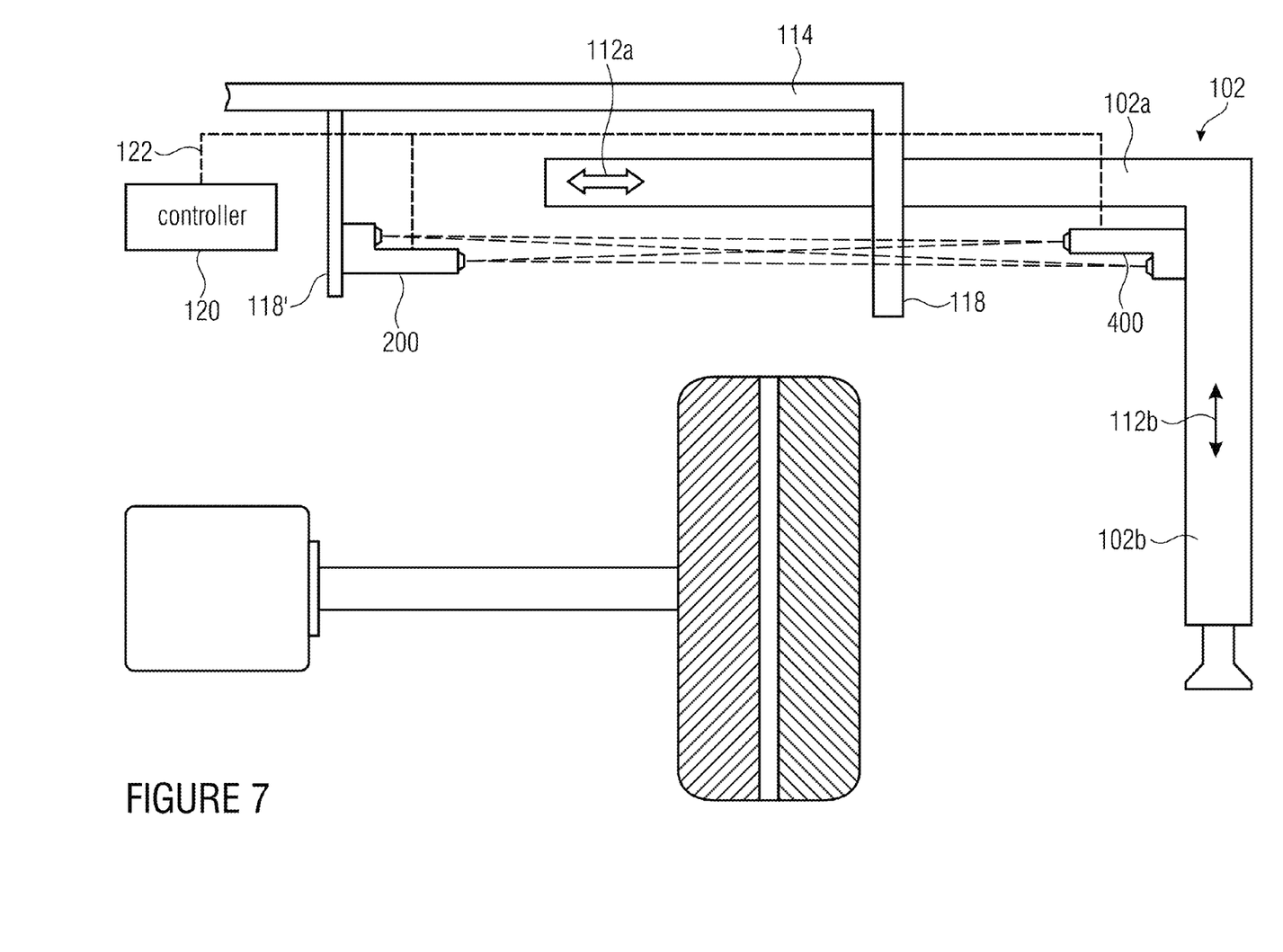
FIG. 7 shows a sensor arrangement similar to that shown in FIG. 6, the sensors being arranged, however, such that the distance between them increases when a support is extended.

In the embodiments described above with reference to FIGS. 3, 4 and 6, the elements of the sensor arrangement were arranged such that upon extending the element 102, the distance between the elements of the sensor arrangement becomes smaller. The present invention, however, is not limited to any one configuration; rather, the sensor elements may also be arranged such that during extension, the distance between the sensor elements increases. An example of such a configuration is explained by means of FIG. 7, which shows a sensor arrangement similar to that described by means of FIG. 6, except for the fact that the sensors are arranged such that the distance between same increases when the support 102 is extended. It shall be noted that the approach described by means of FIG. 7 is also applicable to those approaches which were described by means of FIGS. 3 and 4. FIG. 7 shows that the first sensor 200 is arranged in a stationary manner at a further portion 118' of the chassis, spaced apart from the portion 118, and that the second sensor 400 is arranged at the support 102. In the configuration shown by means of FIG. 7, extending the support 102 results in an increase in the distance between the sensors 200 and 400.

Embodiments of the invention were described above on the basis of supports of mobile machines; however, it shall be noted that the inventive approach is not limited to this. Instead of the extension length in the horizontal direction, a corresponding sensor device may be provided so as to detect, e.g., a vertical movement of the vertical punches 102b. Likewise, provision may be made for detecting the extension length of a telescope cylinder provided, for example, for aligning and/ or lowering a crane arm and/or for extending crane arm segments and for moving a lifting platform.

Embodiments of the invention were described above on the basis of a sensor which includes two mutually offset ultrasound converters; however, the inventive approach is not limited thereto. Alternatively, the sensor may also comprise three or more ultrasound converters in order to enable obtaining even more measurement values by means of one measurement. At least two of the ultrasound converters are arranged such that they are mutually offset in the measuring direction. Alternatively, the several or all of the further ultrasound converters may be arranged such that they are mutually offset in the measuring direction, with identical offsets in each case or with different offsets.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described in connection with or as a method step also represent a description of a corresponding block or detail or feature of a corresponding device.

The above-described embodiments merely represent an illustration of the principles of the present invention. It is understood that other persons skilled in the art will appreciate any modifications and variations of the arrangements and details described herein. This is why the invention is intended to be limited only by the scope of the following claims rather than by the specific details that have been presented herein by means of the description and the discussion of the embodiments.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A device for determining an extension length of an extendable machine part, comprising:
    a first ultrasound sensor; and
    a controller configured to determine the extension length on the basis of an ultrasound signal received by the first ultrasound sensor, wherein
    the first ultrasound sensor comprises a first ultrasound converter and a second ultrasound converter;
    the first ultrasound converter and the second ultrasound converter are directed in a same measuring direction; and
    the first ultrasound converter and the second ultrasound converter are arranged such that they are offset along the measuring direction.

2. The device as claimed in claim 1, wherein the first ultrasound sensor comprises a carrier which comprises the first ultrasound converter and the second ultrasound converter, which are arranged thereon.

3. The device as claimed in claim 2, wherein the carrier comprises two surfaces aligned in the measuring direction and comprising the first ultrasound converter and the second ultrasound converter, which are arranged thereon.

4. The device as claimed in claim 2, wherein the carrier is L-shaped in cross-section.

5. The device as claimed in claim 1, wherein the controller is configured to determine the extension length on the basis of the ultrasound signals received by the first ultrasound converter and the second ultrasound converter.

6. The device as claimed in claim 1, wherein
    the first ultrasound converter and the second ultrasound converter are arranged such that they are offset by a predetermined distance, and
    the controller is configured to derive an ambient temperature on the basis of the distance between the first ultrasound converter and the second ultrasound converter and of a difference in the time delays of the ultrasound signals received by the first ultrasound converter and the second ultrasound converter.

7. The device as claimed in claim 1, wherein the controller is configured to control the first ultrasound sensor to optionally send and receive ultrasound signals.

8. The device as claimed in claim 1, wherein the controller is configured to
    initially control the first ultrasound sensor to send out an ultrasound signal, and
    control the first ultrasound sensor, after the ultrasound signal has been sent out, to receive a reflected ultrasound signal by the first ultrasound converter and by the second ultrasound converter.

9. The device as claimed in claim 8, wherein the first ultrasound sensor is arranged in a stationary manner or is arranged to move in response to a movement of the extendable machine part.

10. The device as claimed in claim 1, further comprising:
a second ultrasound sensor, wherein
the controller is configured to:
control the second ultrasound sensor to send out an ultrasound signal in a direction of the first ultrasound sensor, and
control the first ultrasound sensor to receive the ultrasound signal, sent out by the second ultrasound sensor, by the first ultrasound converter and the second ultrasound converter of the first ultrasound sensor.

11. The device as claimed in claim 10, wherein one of the ultrasound sensors is arranged in a stationary manner, and the other one of the ultrasound sensors is arranged to move in response to a movement of the extendable machine part.

12. The device as claimed in claim 10, wherein the ultrasound sensors are arranged such that their distance increases or decreases the further the extendable machine part is extended.

13. The device as claimed in claim 10, wherein the second ultrasound sensor comprises a first ultrasound converter and a second ultrasound converter which are arranged such that they are offset along the measuring direction, and wherein the controller is configured to control one of the ultrasound converters of the second ultrasound sensor to send out the ultrasound signal.

14. The device as claimed in claim 13, wherein the offset of the ultrasound converters of the first ultrasound sensor and the offset of the ultrasound converters of the second ultrasound sensor are identical, and wherein the first ultrasound sensor and the second ultrasound sensor are arranged such that the distance between the first ultrasound converter of the first ultrasound sensor and the second ultrasound converter of the second ultrasound sensor as well as the distance between the second ultrasound converter of the first ultrasound sensor and the first ultrasound converter of the second ultrasound sensor are identical.

15. The device as claimed in claim 13, wherein the controller is configured to:
control, during a first measurement, an ultrasound converter of the first ultrasound sensor to send out a first ultrasound signal, and to control the ultrasound converters of the second ultrasound sensor to receive the first ultrasound signal in each case,
control, during a second measurement, an ultrasound converter of the second ultrasound sensor to send out a second ultrasound signal, and to control the ultrasound converters of the first ultrasound sensor to receive the second ultrasound signal in each case, and
to generate a plurality of distance values on the basis of the second ultrasound signals received at the ultrasound converters of the first ultrasound sensor and of the first ultrasound signals received at the ultrasound converters of the second ultrasound sensor.

16. The device as claimed in claim 15, wherein the controller is configured to generate one or more temperature compensation signals on the basis of a difference between the second ultrasound signals received at the ultrasound converters of the first ultrasound sensor and on the basis of a difference between the first ultrasound signals received at the ultrasound converters of the second ultrasound sensor.

17. The device as claimed in claim 15, wherein the controller is configured to perform a plausibility evaluation of the measurement on the basis of the distance values.

18. A mobile machine comprising:
an extendable machine part, and
a device for determining an extension length of an extendable machine part, comprising:
a first ultrasound sensor; and
a controller configured to determine the extension length on the basis of an ultrasound signal received by the first ultrasound sensor, wherein
the first ultrasound sensor comprises a first ultrasound converter and a second ultrasound converter;
the first ultrasound converter and the second ultrasound converter are directed in a same measuring direction; and
the first ultrasound converter and the second ultrasound converter are arranged such that they are offset along the measuring direction.

19. The mobile machine as claimed in claim 18, wherein the extendable machine part comprises one or more supports, one or more punches, a work tool, a lifting platform, and/or a telescope cylinder.

* * * * *